F. D. TELLING.
REFRIGERATOR.
APPLICATION FILED JULY 17, 1919.
1,431,766.
Patented Oct. 10, 1922.
2 SHEETS—SHEET 1.
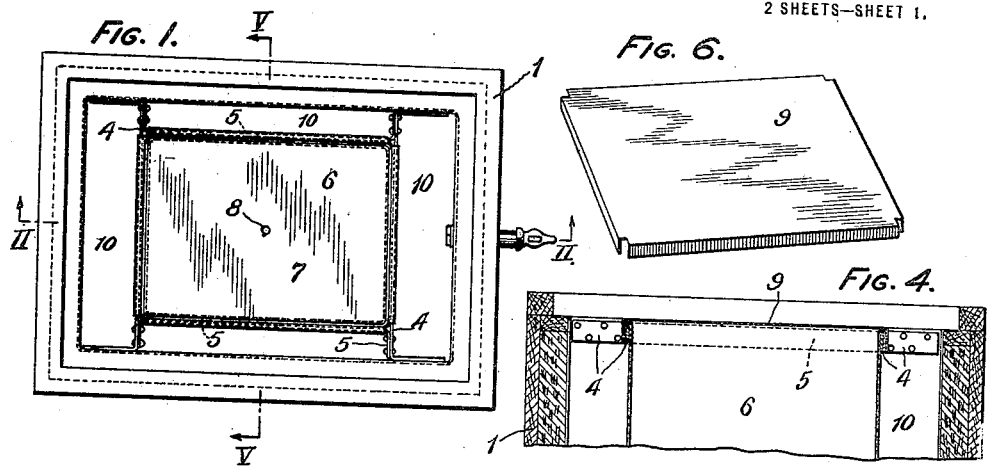
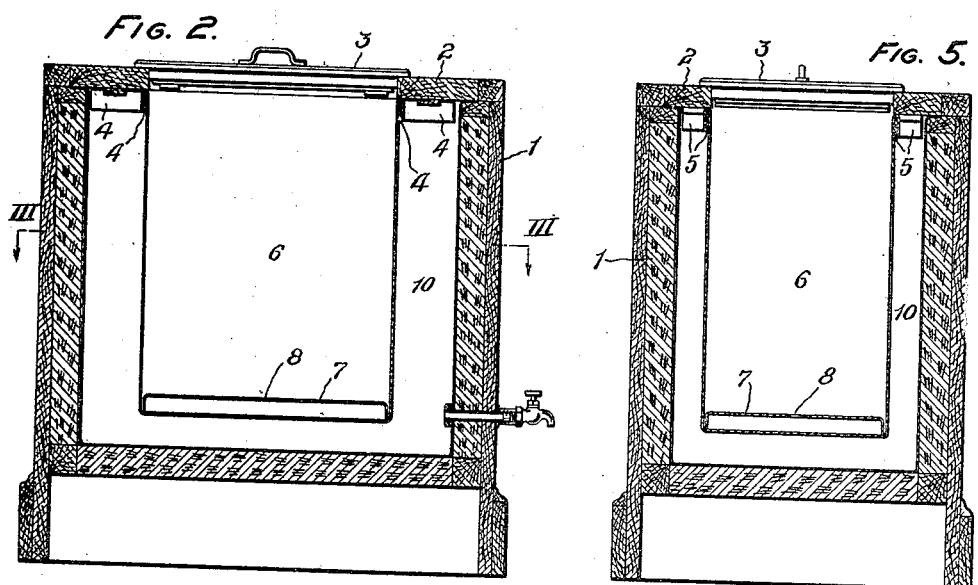
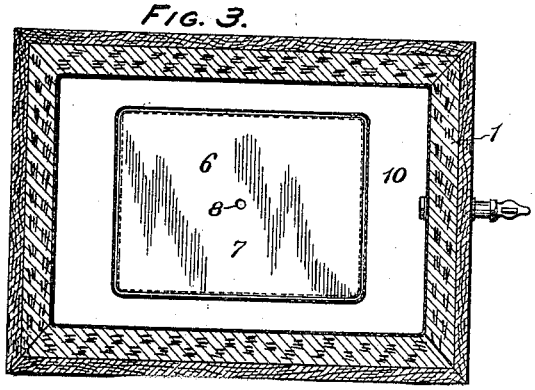
INVENTOR:
FRANK D. TELLING
BY Frease, Merkel and Saywell
ATTORNEYS

F. D. TELLING.
REFRIGERATOR.
APPLICATION FILED JULY 17, 1919.

1,431,766.

Patented Oct. 10, 1922.
2 SHEETS—SHEET 2.

INVENTOR:
FRANK D. TELLING

BY Frease, Morkel and Saywell
ATTORNEYS.

Patented Oct. 10, 1922.

1,431,766

UNITED STATES PATENT OFFICE.

FRANK D. TELLING, OF CLEVELAND, OHIO, ASSIGNOR TO THE TELLING-BELLE VERNON COMPANY, OF CLEVELAND, OHIO, A CORPORATION OF OHIO.

REFRIGERATOR.

Application filed July 17, 1919. Serial No. 311,450.

*To all whom it may concern:*

Be it known that I, FRANK D. TELLING, a citizen of the United States, resident of Cleveland, county of Cuyahoga, and State of Ohio, have invented new and useful Improvements in Refrigerators, of which the following is a specification, the principle of the invention being herein explained and the best mode in which I have contemplated applying that principle, so as to distinguish it from other inventions.

My invention relates to refrigerators and particularly to apparatus of this character for preserving brick ice cream. It is designed by this invention to provide an improved refrigerator into and from which the bricks may be inserted and removed conveniently, which shall preserve said bricks satisfactorily, and which may be conveniently charged with ice without danger of contaminating the cream pocket with ice or salt.

The annexed drawings and the following description set forth in detail certain means embodying my invention, the disclosed means, however, constituting but one of the various mechanical forms in which the principle of the invention may be employed.

In said annexed drawings:

Figure 1 represents a plan view of a unit of my improved refrigerator, the regular cream pocket cover and also a false cover, hereinafter more fully described, both being removed;

Figure 2 represents a vertical section, taken in the plane indicated by the line II—II, Figure 1, showing the standard cream pocket cover in elevation;

Figure 3 represents a horizontal section, taken in the plane indicated by line III—III, Figure 2;

Figure 4 represents a fragmentary vertical section, taken in the plane indicated by the line II—II, Figure 1, showing the false cover in position;

Figure 5 represents a vertical section, taken in the plane indicated by the line V—V, Figure 1, showing the standard cover in position;

Figure 6 represents a perspective of the false cover;

Figure 7:
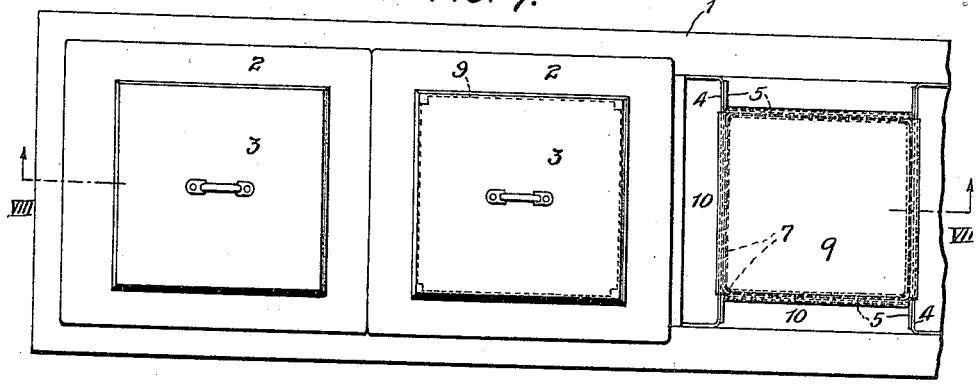
Figure 8:
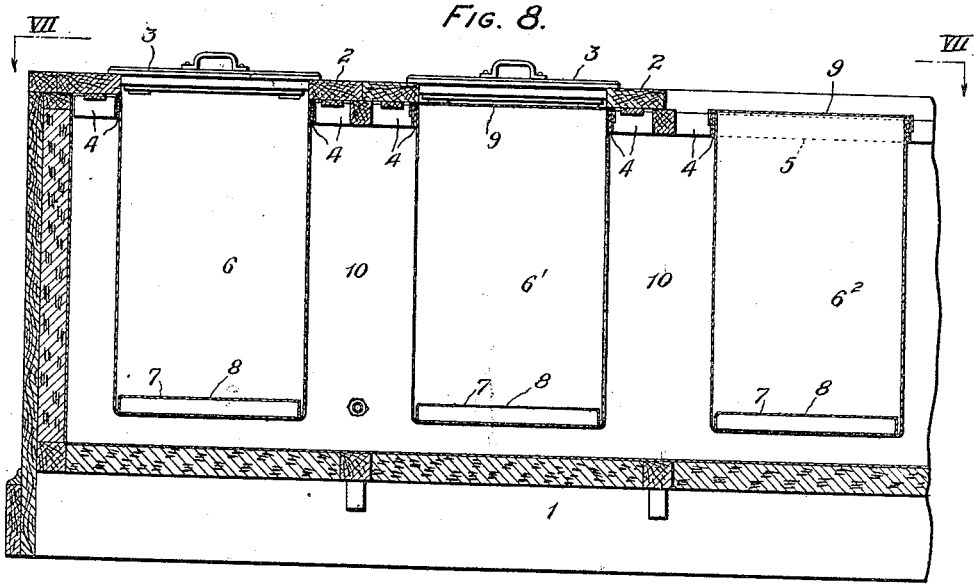

Figure 7 represents a plan view, taken from the plane indicated by the line VII—VII, Figure 8, of a fragmentary portion of a refrigerator comprising a plurality of my improved refrigerator units, one of said units being shown with the standard cream pocket cover only, another of said units being shown with the false cover only, and another of said units being shown with both of said covers; and Figure 8 represents a vertical section, taken in the plane indicated by the line VIII—VIII, Figure 7.

Referring to the annexed drawings, I have provided my improved refrigerator with a standard outer cabinet member 1, the same being of any desirable and approved design for the purpose mentioned. This cabinet member 1 is formed with an open top through which the ice and salt for the refrigerating chamber and the bricks for the ice cream pocket are inserted. Said ice and salt chamber is indicated by the ordinal 10 and the ice cream pocket by the ordinal 6. Covers for said chambers 10 and 6 are provided by the members 2 and 3, respectively, the same being of any approved standard design and of the general shape plainly indicated in the accompanying drawings. The wall members of the pockets 6 are metal and are supported by the metal strips 4 and 5 in the manner plainly indicated in the accompanying drawings, the strips 4 overlapping and firmly secured to the inside of the front and rear walls of the cabinet 1 and the strips 5 being supported by the strips 4. The upper marginal edges of the walls of the pocket 6 are folded over the metal strips 4 and 5, in the manner plainly shown in Figures 1, 2, 4 and 5, for the purpose of sustaining said pocket. The ice cream pocket 6 is provided with a false bottom 7 formed with a central aperture 8, said bottom 7 being furnished for the purpose of holding the bricks up and away from any moisture which may gather therefrom, which moisture runs down through the aperture 8 and collects under the false bottom 7.

For the purpose of charging the chamber 10 with ice and salt, without any danger of contaminating the ice cream pocket 6 or its contents, I have designed and used a false cover 9, plainly shown in Figure 6, which cover is used during said charging, in the manner plainly shown in Figure 4. For this purpose the covers 3 and 2, respectively, are first removed from the cabinet 1, and the false cover 9 placed in position so that when the ice and salt can be freely shoveled into the cabinet without any danger of the same contaminating the pocket 6. If the contents of the pocket 6 are then going to be removed fairly soon and continuously, I remove the cover 9, after having washed the same off when the chamber 10 has been sufficiently charged, and replace the covers 2 and 3, and remove the cream contents through the space covered by the cover 3, as desired. If the contents of the cream pocket 6 are to be left undisturbed for some time, I preferably leave the false cover 9 on and place the covers 2 and 3 over it, as plainly shown in the central unit, Figures 7 and 8, the cream being kept in a better refrigerated condition under these circumstances than if the cover 9 is removed and only the covers 2 and 3 utilized, Figures 2 and 5. As is plainly apparent from Figures 7 and 8, a cabinet of any desired dimensions may be utilized formed with a plurality of spaced ice chambers 10, alternating with a plurality of ice cream pockets 6. In said figures, the three conditions hereinbefore mentioned, as regards the covers 2, 3 and 9, are indicated; pocket 6', Figure 8, indicating the use of all the covers, pocket 6, indicating the use of covers 2 and 3 only, and pocket 6², indicating the use of cover 9 only for ice and salt charging.

By the form of apparatus shown in the accompanying drawings and hereinbefore described, I effect the results desired, the use of the false cover 9 not only protecting the cream pocket 6 and its contents as noted, but also, by reason of the fact that the same is metal and of the design plainly shown in Figure 6, it is conveniently applied and is not rendered useless by a comparatively short period of service, as would be the case if the normal cover 3 or any other wooden structure were used to cover the pocket 6 when the ice and salt is being charged into the pocket 10.

What I claim is:

1. In a refrigerator, the combination of an outer cabinet member formed with an open top, metal strips overlapping and fixedly secured to the inside of the front and rear walls of said cabinet, horizontally arranged metal strips supported by the first-named strips within the cabinet, an open top receptacle mounted on said strips, the upper marginal edges of said receptacle being folded over the strips, and a false cover for said receptacle adapted to be fitted to said strips.

2. A refrigerator of the character described comprising an outer cabinet member formed with an open top, metal strips overlapping and fixedly secured to the inside of the front and rear walls of the cabinet, horizontally arranged metal strips supported by the first-named strips within the cabinet, an open-top receptacle mounted in said strips with its upper marginal edges folded over the strips, a cover for the cabinet, and a false cover for said receptacle adapted to be fitted to the strips, each of said covers being adapted to provide a tight seal and to be used together or separately.

Signed by me, this 29" day of April, 1919.

FRANK D. TELLING.